United States Patent Office 2,954,283
Patented Sept. 27, 1960

2,954,283
FUEL MIXTURES
David Horvitz, Cheverly, Md., assignor to National Distillers and Chemical Corporation, a corporation of Virginia No Drawing. Filed Dec. 2, 1957, Ser. No. 699,939

2 Claims. (Cl. 52—.5)

This invention relates to the production of methylated derivatives of hydrazine, to mixtures and solutions containing such methylated derivatives, and to methods of obtaining substantial yields of preferred products.

This application is a continuation-in-part of Serial No. 456,317, filed September 15, 1954.

Among the objects of the present invention is the production of methylated derivatives of hydrazine from hydrazine, lower methylated derivatives of hydrazine, sulfates of hydrazine and lower methylated hydrazines, and any desired mixtures or solutions thereof.

Other objects include methods of control to accentuate the extent of methylation desired.

Further objects include methods of recovery of the desired derivatives.

Still further objects and advantages of the present invention will appear from the more detailed description set forth below, it being understood that such more detailed description is given by way of illustration and explanation only and not by way of limitation since various changes therein may be made by those skilled in the art without departing from the scope and spirit of the present invention.

In accordance with the present invention, it has been found that hydrazine and its various derivatives may be methylated under controllable conditions to give substantial yields of methylated hydrazines by the use of dimethylsulfate, methyl sulfuric acid, or an alkali methyl sulfate. For example, hydrazine may be reacted with a methylating sulphate, such as dimethylsulfate, methyl acid sulphate, and alkali methyl sulphate, and depending on the relative ratio of materials used and the conditions under which the reaction is conducted, there can be obtained differing quantities of the various hydrazine derivatives; i.e., methylhydrazine, uns-dimethylhydrazine, symmetrical dimethylhydrazine, trimethylhydrazine and the quaternary salts thereof. In general, it is difficult to get exclusively one derivative, but the reaction may be performed so that a particular desired derivative is predominant. The individual derivatives can be isolated and purified as desired; for example, by fractional distillation or by azeotropic distillation.

The reaction of the methylating agent with hydrazine or with methylated hydrazines may be performed in a variety of ways. It may be performed in a solvent such as alcohol, e.g. ethanol, isopropanol, ethylene glycol or other glycols; in a diluent which is immiscible with hydrazine but miscible with the methylating agent such as toluene, xylene or other hydrocarbons or ethers or alcoholic ethers or other inert diluents; or water which is miscible with hydrazine but not with dimethylsulfate, may be used; or combinations of these solvents or diluents. Alkali or alkaline earth oxides, hydroxides or carbonates can be used in appropriate equivalent quantities. On the other hand, it is found also possible to perform this reaction without any solvents and without any fixed caustic present, and in effect, this is the more desirable method.

In the preferred process the methylating agent is added with stirring and cooling to the anhydrous hydrazine (commercial grades may vary from 90% to 100%, all concentrations being useable in the process). During this reaction, cooling is desirably applied to absorb the considerable heat which is evolved. The reaction temperature is commonly maintained at about 30° C. but the temperature may vary, for example, from below 0° up to 135° C. If performed in the upper temperature range, the products of reaction distill simultaneously with the input of methylating agent. In general, it is preferable to compete the admixture of the desired molar proportions of methylating agent and hydrazine before this distillation commences. Consequently, in a batch-size process it is preferable to add all of the methylating agent to the hydrazine or methylated hydrazines at a lower temperature range, such as 30° C., before the next stage (i.e., the distillation stage) is reached. In a continuous operation it is possible to mix continuously the correct molar proportions of methylating agents and hydrazine and to allow the temperature to rise immediately to the distillation stage. The reaction mixture produced at the lower temperature is capable of undergoing an exothermic reaction and indeed does so even if allowed to stand at ambient temperature. In the latter case, the reaction proceeds to completion slowly in a matter of many hours. If the heat generated during this reaction is not dissipated, it will cause a general increase in the temperature of the mass until a point is reached where the reaction proceeds at a very rapid rate. This reaction temperature is approximately 90° C. It is customarily preferable to take the reaction mixture when it has been prepared at the lower temperature range such as approximately 30° C. and to add a small quantity to a reaction vessel; heat this material to about 115° C. to insure that the exothermic stage of the reaction has commenced at a rapid rate and then add the remaining reaction solution continuously to this vessel at the same time that distillation products are taken off. For the most part, no heat has to be added to this reaction to maintain the temperature since it is exothermic and the temperature is controlled primarily by the rate at which the reaction solution is added to the vessel. Occasionally it may be necessary to apply heat to accelerate the reaction. The product which distills may be a varying mixture of the different methylhydrazines depending upon which molar ratio of reactants, such as hydrazine to methylating agent was used. The distillation product can be fed into a column directly to take off by fractionation the products in proper sequence depending upon their boiling points. Where solvents, such as isopropyl alcohol or toluene have been used, special separation processes may be used, depending on the amount and kind of solvent employed and on the particular hydrazine derivatives which have been formed. However, the yields and relative quantity of product obtained are similar whether a solvent or a diluent has been used. The amount of solvent or diluent used therefore is not critical and it serves primarily as a heat dissipating agent.

The reaction mass which is left behind after the exothermic distillation when dimethylsulfate has been used as the methylating agent, consists primarily of a solid which contains two moles of hydrazine or methylated hydrazine to one mole of methyl acid sulfate, although this is not intended to represent the actual chemical constitution of this material. There may also be present some excess hydrazine or methylated hydrazine.

Depending on the molar ratios of hydrazine to methylating sulphate such as dimethylsulfate, the first distillate contains differing proportions of derivatives. For example, if the molar ratio of hydrazine to dimethylsulfate is equal to 3.75, then the resulting distilled product contains about 1.5 parts by weight of methylhydrazine and one part by weight unsymmetrical dimethylhydrazine, as well as 1 to 3% by weight of symmetrical dimethylhydrazine and trimethylhydrazine. If the molar ratio of hydrazine to dimethylsulfate is three to one, then the distilled product contains approximately 1.4 parts of uns-dimethylhydrazine to one part of methylhydrazine. In this case also there is 1 to 3% of symmetrical dimethylhydrazine and trimethylhydrazine. At a molar ratio of 2.5 to 1, the proportion of unsymmetrical dimethylhydrazine to methylhydrazine is about 3.1 to 1. Furthermore, about 10% of the weight of methylated products in the distillate is trimethylhydrazine. With lower mole ratios the tendency towards higher degree of methylation of the hydrazine molecule increases, but at the same time the tendency toward formation of quaternary salts also increases. Unless quarternary salt is a desired product, its formation results in loss of useful hydrazine and dimethylsulfate. It is also possible to react the dimethylsulfate with already methylated hydrazines or their mixtures with hydrazine. For example, a mixture of methylhydrazine with hydrazine, when treated with dimethylsulfate, gives a much higher proportion of unsymmetrical dimethylhydrazine; treatment of symmetrical dimethylhydrazine with dimethylsulfate gives a high yield of trimethylhydrazine. The relative quantities of materials given in this paragraph represent only the materials obtained from the first distillation during the exothermic phase. The products that are obtained at a molar ratio of 3.75 to 1 represent a 100% yield based on the number of methyl groups introduced into the hydrazine molecule and assuming only one methyl group available in this stage per molecule of dimethylsulfate. On the same basis it is found that for a molar ratio of 3 to 1 about 92% of the available methyl groups are found in the volatile methylated products; at a molar ratio of 2.75 to 1 about 80% are used; and at 2.5 to 1 about 63% are used. The methyl groups not found in the volatile products are probably present as quaternary salts. The residue referred to previously which contains the molar proportions of approximately 2 moles of hydrazine to one mole of methyl acid sulfate is treated by adding an alkali or alkaline earth oxide or hydroxide such as sodium hydroxide or calcium hydroxide to it while maintaining a temperature from 85° C. to 100° C. The residue is a solid which is found to melt at about 85° C. but when some caustic has reacted with it, it becomes more fluid and so can be treated with further caustic at lower temperatures then 85° C. and at temperatures as high as the boiling point of the released products. Either solid or aqueous caustic can be added and the reaction performed at temperatures ranging from ambient to the boiling point.

Other diluents or solvents, such as alcohols, hydrocarbons or ethers, may be used and the caustic may be added as an aqueous or alcoholic solution, or as a solid at temperatures ranging from approximately room temperature to the boiling point of the mixture. At temperatures below 85° C. the solid caustic goes into reaction very slowly, but above 85° C., the reaction proceeds readily and with some vigor. Two moles of caustic are desirably added for every mole of sulfate that is present, although it is sometimes desirable to add less than this amount of caustic, as further explained below.

The further treatment of the residue with alkali serves to promote further methylation by use of the second methyl group of the dimethylsulfate molecule. It also permits recovery of excess hydrazine. At this stage also it is possible to obtain formation of differing proportions of methylated products, depending on the manner in which the reaction is performed. If the solid alkali is added to the residue at 85° C. to 100° C. in amount equivalent to the sulfate present, then approximately 0.25 to 0.30 mole of methylhydrazine per mole of dimethylsulfate that was used in the reaction, is obtained; about 0.2 to 0.3 mole of quaternary salt per mole of dimethylsulfate; and the remainder of the hydrazine used in the reaction is recoverable as such. When the reaction is conducted in this manner, a large portion of the methyl groups become tied up as quaternary salt. However, if less than an equivalent quantity of caustic is used it is possible to obtain greater quantities of unsymmetrical dimethylhydrazine and methylhydrazine, and less quaternary salt formation. Another method is to distill off methylated products as they are formed during the addition of the caustic. In this way a much higher percentage of volatile methylated hydrazine products is obtained and less quaternary salt is formed.

The aforementioned reaction can be performed also by adding the methylating agent to hydrazine at elevated temperature and distilling off methylated products as they are formed. It is preferable in this case to use a fractionating column and maintain reflux and take-off at such rate as to take off the desired product. This method is most useful for producing a maximum of unsymmetrical dimethylhydrazine which boils at 63°–64° C. This procedure can be used with or without added alkali, although it is preferable without the alkali, because at this stage the alkali saponifies an appreciable portion of the methylsulfate to methanol. On the other hand, the alkali treatment to utilize the second methyl group as described previously, does not saponify the methyl group.

It is found that the same principles and procedures apply whether dimethylsulfate is used or methylsulfuric acid or an alkali methylsulfate, such as sodium methylsulfate. There is a difference in that no second methyl group is involved and subsequent treatment of the residue is primarily to recover excess hydrazine or methylated hydrazine, but not to induce further methylation.

A modification of the methylation reaction which is useful, in that it produces relatively large quantities of methylhydrazine and permits easier recovery of excess hydrazine, is the following:

Dihydrazine sulfate is dissolved in a minimum of water and one mole (per mole of the dihydrazine sulfate) of dimethylsulfate is added over a period of time. During this addition, monohydrazine sulfate which is relatively insoluble in water separates out almost quantitatively as a crystalline white solid. When all the dimethylsulfate has been added, the solution is filtered, and the filtrate is added to a hot slurry of solid alkali or alkaline earth hydroxide in water. At least two equivalents of caustic are used for every mole of dimethylsulfate which was used in the initial reaction; in addition excess caustic may be used to facilitate the distillation of the methylated hydrazine products. As the initial reaction product is added to the hot alkali, a product distills off which contains a relatively small portion of unsymmetrical dimethylhydrazine, but predominantly methylhydrazine. Under these conditions some methanol is also produced because of saponification of the dimethylsulfate. The relative proportions of dimethylsulfate to dihydrazine sulfate may be varied from that given. In addition excess hydrazine above that in the dihydrazine sulfate may be used. The excess hydrazine may be added before the addition of the methylsulfate, or to the filtrate after filtering off the monohydrazine sulfate. The monohydrazine sulfate is used for the next reaction by simply adding another equivalent of hydrazine.

It is also possible to add an equivalent of methylhydrazine (or other methylated hydrazine product) to the monohydrazine sulfate in order to produce more highly methylated products. The reaction intermediate obtained as filtrate after filtering off the monohydrazine sulfate can be treated with alkali as already indicated or may be treated by adding caustic to it and then distilling; or distillation may go on while caustic is added to it. These variations of technique result in different relative and absolute amounts of the various methylated hydrazines, and the method chosen is determined by the products particularly desired. Another variation of this method involves a similar system using a non-aqueous system, such as ethyleneglycol, glyerol, methanol; the reaction is performed in similar fashion.

The volatile products, methylhydrazine, unsdimethyl-hydrazine, sym-dimethylhydrazine, trimethylhydrazine, and excess hydrazine are readily separated from each other in pure form by fractionation in an efficient distilling column. The lowest boiling fraction is trimethylhydrazine which boils at 60°–61° C.; then follows unsymmetrical dimethylhydrazine at 63°–64° C.; then symmetrical dimethylhydrazine at 80°–81° C.; and finally methylhydrazine at 87°–88° C. The most difficult to separate from each other are trimethylhydrazine and unsymmetrical dimethylhydrazine which have boiling points very close to each other. Ultimate separation is possible by fractionation, but it requires a high fractioning efficiency. A convenient method for separating them is to add enough methanol to form an azeotrope with the unsymmetrical dimethylhydrazine. This azeotrope boils at about 71°–73° C., contains about 55% unsymmetrical dimethylhydrazine and because of the higher boiling point is easily separated from the trimethylhydrazine. The first distillate is often found to produce slight amounts of colored products on fractionation which tend to color the various fractions. This difficulty is taken care of by adding a small quantity of an alkaline reagent, such as alkali or alkaline earth oxide, hydroxide or carbonate before fractionation. For certain uses mixtures of these methylated hydrazines are valuable and it is then desirable to perform the reaction with those mole ratios and conditions which give the sought for proportions of products. If the proportion is correct, it is sufficient to distill the mixtures without rectification. Mixtures of this sort, as well as the individual compounds, are useful as fuels for jet propulsion. Certain mixtures, particularly those of methylhydrazine, uns-dimethylhydrazine, trimethylhydrazine and hydrazine, where two or more of these named components may be present in varying proportions, have advantages in certain cases with respect to cost, freezing point, boiling point, density, hypergolic ignitibility, and other properties.

In accordance with one particularly important feature of the invention, it has been found that certain mixtures of unsymmetrical dimethylhydrazine and methylhydrazine has outstanding utility as rocket propellants. These mixtures may be employed as rocket fuels in combination with any of the known oxidizers employed for rocket purposes such as nitric acid, oxygen, etc. They may also be utilized without an oxidizer, since they are capable of acting as monopropellants in view of their high internal energy content. In general, the inventive propellant compositions will comprise about 20 to 80% by weight of uns-dimethylhydrazine and about 20 to 80% by weight of methylhydrazine. The art has previously recognized that uns-dimethylhydrazine and methylhydrazine are valuable fuels for rocket propulsion. These compounds produce higher performances than the more conventional propellants, have relatively low freezing points and are hypergolic with nitric acid. The theoretical performance of methylhydrazine is slightly higher than that of uns-dimethylhydrazine. In addition, the former material has a higher density, boiling point and heat capacity, properties which are desirable in a rocket fuel. The freezing point of methylhydrazine is −62.3° F., which is somewhat higher than the maximum value considered acceptable for general propellant use; while the freezing point of uns-dimethylhydrazine is −71° F. As set forth above, it has now been found that by mixing the uns-dimethylhydrazine and methylhydrazine together fuel compositions result which offer significantly superior characteristics over the use of each individual component. It will be understood that the advantages to be secured by mixing the two components will vary depending on the relative proportions of the components in the mixture. Thus, freezing points below −71° F., the freezing point of the lowest melting component, are obtained by adding a small quantity of methylhydrazine to uns-dimethylhydrazine. The freezing point will remain below −71° F., as the proportion of methylhydrazine is increased until a composition containing 80% by weight methylhydrazine and 20% by weight uns-dimethylhydrazine is reached. A preferred propellant mixture will comprise about 30 to 50% by weight of methylhydrazine and about 50 to 70% by weight of uns-dimethylhydrazine.

An especially outstanding rocket propellant has been found when a eutectic mixture of uns-dimethylhydrazine and methylhydrazine is utilized. The eutectic mixture will contain about 39.8% by weight of methylhydrazine and about 60.2% by weight of uns-dimethylhydrazine. The eutectic mixture has a freezing point of about −112° F. This extremely low freezing point offers distinct advantages for certain propulsion applications. The mixture has the following advantages over uns-dimethylhydrazine by itself: lower freezing point, higher density, higher boiling point, higher heat capacity and higher performance. It has the following advantages over methylhydrazine by itself: lower freezing point, lower cost and the eliminatiton of detonability, since methylhydrazine vapors, even in the absence of air, can be detonated by a hot wire while the eutectic mixture of methylhydrazine and uns-dimethylhydrazine is not detonable under the same conditions. Though the eutectic mixture, i.e., the point of lowest freezing, occurs at a single, exact composition, as set forth above, in practice small variations in the percentage of the components in the composition will not greatly affect the desirable characteristics of the mixture.

In general, the novel mixtures of methylhydrazine and unsymmetrical methylhydrazine encompassed by this invention may be prepared directly by simply mixing the two components together in the desired amounts. It is also contemplated that various mixtures of these compounds containing other material may be subjected to rectification to obtain the desired mixture or separate fractions of pure methylhydrazine and unsymmetrical dimethylhydrazine, which can then be readily blended together.

The invention will be more fully understood by reference to the following illustrative examples.

Examples I 5760 grams of anhydrous hydrazine were placed in a reaction flask, and to it with stirring and cooling, were added 6050 grams of dimethylsulfate. An ice-salt bath was used for cooling and the temperature in the reaction mixture was maintained between 20° and 30° C. To another flask equipped with stirrer and condenser for down distillation, about 150 to 200 mls. of the reaction solution were added and brought to a temperature of approximately 115° by external heating. Distillation of a liquid commenced and then the remainder of the initial reaction solution was added at such rate that the temperature in the reaction mixture remained between 125 and 135° C. At the same time product continuously distilled over. When the reaction was finished, the distillate was fractionated in a column and the following products obtained out of the mixture: about 1.64 pounds of unsymmetrical dimethylhydrazine (BP. 63° to 64° C.); 2.45 pounds of methylhydrazine (B.P. 87° to 88° C.); 0.12 pound of symmetrical dimethylhydrazine (B.P. 80° to 81° C.); 0.04 pound of trimethylhydrazine (B.P. 60° to 61° C.); and 0.66 pound of hydrazine. The fractionation was performed in a column which had 15 to 20 theoretical plates. A forerun between 60° and 63° C. contained the trimethylhydrazine plus some unsymmetrical dimethylhydrazine. This forerun was further fractionated in a small column; it required two further fractionations to obtain the pure trimethylhydrazine. In the big column uns-dimethylhydrazine was taken off between 63.2° and 63.8° C. A center-cut was taken off between 63.8 and 87.3° C. Finally the methylhydrazine was taken off between 87.3° C. and 87.8° C. The center-cut was separately fractionated in a small column to give uns-dimethylhydrazine, symmetrical dimethylhydrazine (from 80° to 81° C.) and methylhydrazine. To get pure symmetrical dimethylhydrazine the 80° to 81° C. fraction was fractionated once more.

The residue left after the exothermic distillation was treated with 3850 grams of solid sodium hydroxide at 85° to 100° C. From this mixture was recovered 1.5 pounds of methylhydrazine and 6.7 pounds of hydrazine.

*Example II*

A reaction was performed as in Example I, except that 5120 grams of hydrazine were used and 6720 grams of dimethylsulfate. The first distillate was found to contain the following: 2.07 pounds of uns-dimethylhydrazine; 1.50 pounds of methylhydrazine; 0.12 pound of symmetrical dimethylhydrazine; 0.08 pound of trimethylhydrazine; and 0.20 pound of hydrazine. The residue remaining after the exothermic distillation was treated with 3300 grams of sodium hydroxide (only 77% of the equivalent amount). Distillation of the resulting product gave about 0.6 pound of unsymmetrical dimethylhydrazine, about 2.6 pounds of methylhydrazine and about 3.1 pounds of hydrazine.

*Example III*

7560 grams of dimethylsulfate were reacted with 4800 grams of anhydrous hydrazine, as described in the previous examples. The first distillate was found to contain the following: 1.78 pounds of unsymmetrical dimethylhydrazine; 0.58 pound of methylhydrazine; 0.27 pound of trimethylhydrazine; negligible quantities of symmetrical dimethylhydrazine and hydrazine. The residue obtained after the first distillation was treated with 4800 grams of solid sodium hydroxide which was added while the mixture was heated and allowed to distill off part of the resulting products through a short fractionating column. The resulting distillate was found to contain 1.5 pounds of unsymmetrical dimethylhydrazine; 3.2 pounds of methylhydrazine and 3.8 pounds of hydrazine.

*Example IV*

576 grams of anhydrous hydrazine were diluted with one liter of isopropanol and to this solution were added 540 grams of potassium hydroxide. To this mixture, with cooling and stirring, were added 608 grams of dimethylsulfate. After all the dimethylsulfate had been introduced, the reaction mixture was heated to distill off the product. When the temperature reached approximately 85° to 90° C., an exothermic reaction set in and cooling had to be applied to control the distillation. The distillate consisted of a mixture of isopropanol together with the methylated hydrazines and some excess hydrazine. Sulfuric acid was added to the distillate, and it was evaporated almost to dryness. The residue was treated with 50% sodium hydroxide solution in water and then fractionated. The final product was found to contain approximately 70 grams of unsymmetrical dimethylhydrazine, 150 grams of methylhydrazine and 325 grams of hydrazine. Symmetrical dimethylhydrazine and trimethylhydrazine were present in minor quantities only.

*Example V*

576 grams of anhydrous hydrazine were diluted with 500 mls. of toluene, with which it is immiscible, and 608 grams of dimethylsulfate were added with cooling and stirring. After the dimethylsulfate had been added, it was found that the toluene was present as an immiscible layer on top of the reaction mixture. The toluene layer was removed and the remainder was treated as in Example I, both with respect to the first distillation and then treatment with caustic. The products obtained by fractionation were in about the same proportion as obtained in Example I.

*Example VI*

A reaction was performed as in Example V, except that 576 mls. of water were used as solvent instead of the toluene. The products obtained were in approximately the same relative proportions, but the over-all yield was about 10% lower.

*Example VII*

150 grams of potassium methylsulfate were added slowly with stirring and cooling to 64 grams of anhydrous hydrazine. From this mixture a distillate was obtained which contained about 5 grams of unsymmetrical dimethylhydrazine and 16 grams of methylhydrazine. Some quaternary salt was also found in this reaction because of the low molar ratio of hydrazine to potassium methylsulfate.

*Example VIII*

150 grams of potassium methylsulfate were added with cooling and stirring to 92 grams of methylhydrazine. The distillate from this reaction was found to contain about 22 grams of unsymmetrical dimethylhydrazine and 11 grams of methylhydrazine.

*Example IX*

To a mixture containing 64 grams of hydrazine, 80 grams of sodium hydroxide and 80 grams of water were added 126 grams dimethylsulfate while the reaction mixture was maintained at a temperature range of 80° C. to 120° C. and distillate allowed to come off at the same time. The distillate was found to contain about 12.5 grams of an azeotropic mixture of methanol and unsymmetrical dimethylhydrazine, the composition of this azeotrope being approximately 55% unsymmetrical dimethylhydrazine and the remainder methanol. Only slight amounts of methylhydrazine were recovered.

*Example X*

63 grams of dimethylsulfate were added with stirring and cooling to 120 grams of symmetrical dimethylhydrazine. The distillate from this product was found to contain about 41 grams of trimethylhydrazine and 31 grams of symmetrical dimethylhydrazine. The distillation residue was treated with 44 grams of sodium hydroxide and then distilled to give about 10 grams of symmetrical dimethylhydrazine containing 1 or 2 grams of trimethylhydrazine.

*Example XI*

To a mixture of 128 grams of hydrazine and 552 grams of methylhydrazine were added 504.5 grams of dimethylsulfate. The distillate from this reaction contained 187 grams of unsymmetrical dimethylhydrazine and 215 grams of methylhydrazine. From the residue treated with sodium hydroxide were obtained approximately 124 grams of hydrazine and 85 grams of methylhydrazine as distillate. Remaining in the residue were approximately 2 moles of trimethylhydrazanium quaternary salt.

*Example XII*

975 grams of monohydrazine sulfate were treated with 240 grams of hydrazine, plus enough water to bring the resulting dihydrazine sulfate into solution. To this solution were now added 945 grams of dimethylsulfate, during which time the reaction mixture was stirred and maintained in a temperature range of 60° to 85° C. During the course of the addition, monohydrazine sulfate precipitated out of the solution as a white crystalline solid. At the end of the reaction the mixture was filtered to give an almost quantitative return of the monohydrazine sulfate used at the commencement of the reaction. The filtrate was then dropped upon a stirred slurry of 1725 grams of solid sodium hydroxide to which had been added 250 mls. of 50% sodium hydroxide solution in water. At the same time the reaction flask was heated so that the product distilled simultaneously as the filtrate was added to the caustic. About 750 mls. of distillate were obtained and fractionated. Found in the separate fractions were approximately 71 grams of unsymmetrical dimethylhydrazine, 30 grams of trimethylhydrazine, 34 grams of methanol (obtained as an azeotrope with unsymmetrical dimethylhydrazine; this azeotrope boils at 71°–73° C.), and 180 grams of methylhydrazine.

*Example XIII*

An apparatus was arranged to permit hydrazine and dimethylsulfate to flow continuously at controlled rates into the bottom of a small, narrow, cooled chamber equipped with stirrer. The mixture formed therein could overflow out of the top and into the bottom of a heated, packed column. This column was so arranged that distillate could be condensed at the top and drawn off, while the hot, molten residue could overflow into another vessel. This apparatus was employed to conduct a continuous reaction between hydrazine and dimethylsulfate. In an experiment in which these reactants were fed into the system at a molar ratio of 3.75 moles of hydrazine to 1 mole of dimethyl sulfate, the distillate was found to contain approximately the same relative proportions and yields as obtained in Example I. The residue was treated as in Example I with similar results.

What is claimed is:

1. A rocket propulsion fuel mixture consisting essentially of a eutectic mixture of methylhydrazine and unsymmetrical dimethylhydrazine.

2. A rocket propulsion fuel mixture consisting essentially of about 39.8% by weight of methylhydrazine and about 60.2% by weight of unsymmetrical dimethylhydrazine.

References Cited in the file of this patent
UNITED STATES PATENTS 2,712,496     Skolnik et al. _____ July 5, 1955

OTHER REFERENCES

Westphal: Ber. der deut. Chem. Ges., 74 (1941), pages 759–776.

Harshman: Jet Propulsion, April 1957, pages 398–400.